United States Patent
Desai et al.

(10) Patent No.: US 9,020,131 B2
(45) Date of Patent: *Apr. 28, 2015

(54) CONTACT CENTER CALL BACK

(71) Applicant: Verizon Patent and Licensing Inc., Basking Ridge, NJ (US)

(72) Inventors: Prashant Desai, Land o Lakes, FL (US); Mayuresh Hegde, Irving, TX (US); Manah M. Khalil, Coppell, TX (US); Parind Poi, Lewisville, TX (US); Shawn J. Hadley, Keller, TX (US); Paul V. Cunningham, Flower Mound, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/176,509

(22) Filed: Feb. 10, 2014

(65) Prior Publication Data

US 2014/0153703 A1 Jun. 5, 2014

Related U.S. Application Data

(63) Continuation-in-part of application No. 13/037,688, filed on Mar. 1, 2011, now Pat. No. 8,718,272.

(51) Int. Cl.
*H04M 3/00* (2006.01)
*H04M 3/523* (2006.01)
*H04M 3/493* (2006.01)
*H04M 3/51* (2006.01)

(52) U.S. Cl.
CPC ............ *H04M 3/5231* (2013.01); *H04M 3/493* (2013.01); *H04M 3/5233* (2013.01); *H04M 3/5166* (2013.01); *H04M 2203/551* (2013.01)

(58) Field of Classification Search
CPC ..... H04M 3/51; H04M 3/523; H04M 3/5231; H04M 3/5233
USPC ...................................................... 379/265.02
See application file for complete search history.

(56) References Cited

U.S. PATENT DOCUMENTS

| | | | |
|---|---|---|---|
| 5,627,884 A | 5/1997 | Williams et al. | |
| 6,563,921 B1 | 5/2003 | Williams et al. | |
| 6,754,334 B2 | 6/2004 | Williams et al. | |
| 7,746,999 B2 | 6/2010 | Williams et al. | |
| 7,787,610 B1 | 8/2010 | Williams et al. | |
| 8,112,069 B2 | 2/2012 | Williams et al. | |
| 8,150,023 B2 | 4/2012 | Williams et al. | |
| 8,213,911 B2 | 7/2012 | Williams et al. | |
| 8,233,609 B2 * | 7/2012 | Noble, Jr. | 379/265.01 |
| 2002/0146110 A1 * | 10/2002 | Fromm | 379/265.02 |

* cited by examiner

*Primary Examiner* — Sonia Gay

(57) ABSTRACT

A method may include receiving a call from a caller and determining whether the call has been queued for at least a predetermined period of time. The method may also include interacting with the customer via an interactive voice response unit, in response to determining that the call has been queued for at least the predetermined period of time, to offer a call back service to the customer. The call back service may include a scheduled call back or an immediate type call back when an agent is available. The method may further include receiving, from the customer and via the interactive voice response unit, an indication that the customer would like a call back and queuing the call back.

20 Claims, 13 Drawing Sheets

| | AGENT 702 | RATING 704 | SKILL 706 | STATUS 708 | LOCATION 710 |
|---|---|---|---|---|---|
| 720 | 0146/JOE SMITH | 89 | ORDERS;BILLING | ON CALL | 148-3 |
| 730 | 0046/NANCY ROGERS | 85 | ORDERS; BILINGUAL | AVAILABLE | 148-11 |
| 740 | 0214/ANDY FIELDS | 65 | TROUBLESHOOTING | NOT LOGGED IN | 148-22 |
| | ... | ... | ... | ... | ... |

| | TELEPHONE NUMBER 712 | NAME 714 | LAST AGENT 716 | OTHER 718 |
|---|---|---|---|---|
| 760 | 555-742-1234 | BILL JONES | 0146/JOE SMITH | LAST CALL 10/7/13; NEW ORDER |
| 770 | 703-123-4567 | MARY THOMPSON | 0214/ANDY FIELDS | LAST CALL 12/1/13; PROBLEM |
| 780 | 571-987-6543 | SUE ANDERSON | 0315/JILL BROWN | LAST CALL 1/8/14; BILLING ISSUE |
| | | | | |
| | | | | |

CONTACT CENTER CALL BACK

RELATED APPLICATION

This application is a continuation-in-part of U.S. patent application Ser. No. 13/037,688 filed Mar. 1, 2011, the disclosure of which is hereby incorporated herein by reference in its entirety.

BACKGROUND INFORMATION

Companies often use call centers to address customer inquiries, take customer orders and/or resolve customer problems. Interactive voice response (IVR) systems are frequently used to initially interact with the caller to obtain information regarding the call. The call is then often transferred to a human agent to service the customer's inquiry and provide the desired assistance.

BRIEF DESCRIPTION OF THE DRAWINGS

FIGS. 7A and 7B illustrate exemplary tables used by one or more of the components illustrated in FIGS. 1 and 2.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to offering call back services to customers that contact a call/contact center. In one implementation, a customer is given an option to receive a call back when the call/contact center has no agents that are available to handle the customer's request at the current time. A voice portal may interact with the customer to either schedule a call back at a particular agreed upon time or provide a call back when a next available agent is available to service the call. In some implementations, if the customer previously contacted the call center within a predetermined period of time, the call back communication (e.g., telephone call) may be handled by the same agent that handled the previous interaction/call. In addition, in some implementations, the routing or decision engine associated with queuing the call back may determine whether the particular agent that handled the previous call has the skill set to handle the current call/communication and/or whether the agent has an internal quality rating that is above a threshold level before determining whether to allow the previous agent to handle the call back for the current call/communication.

Figure 1:
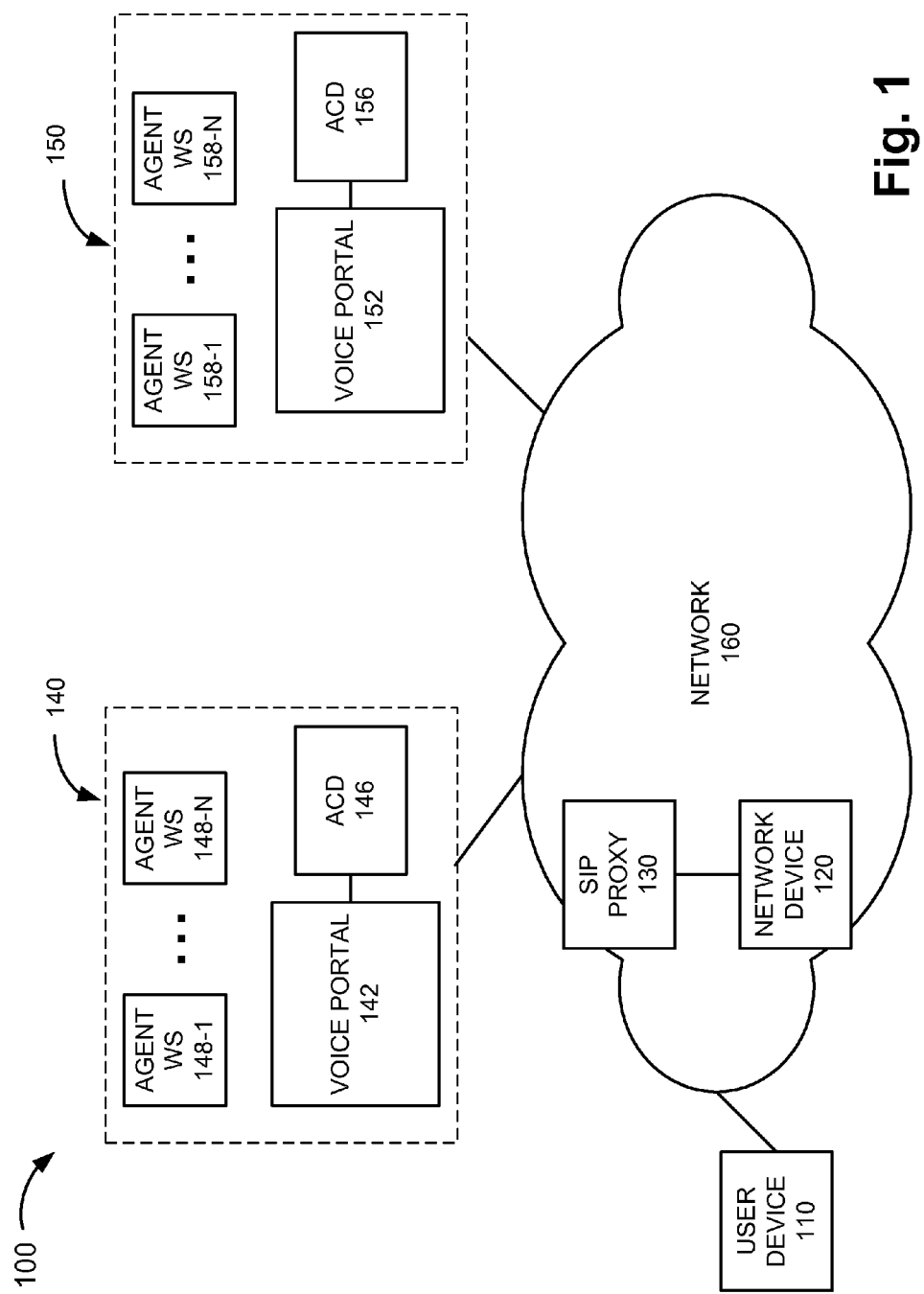
FIG. 1 illustrates an exemplary network in which systems and methods described herein may be implemented.

FIG. 1 is a block diagram of an exemplary network 100 in which systems and methods described herein may be implemented. Referring to FIG. 1, network 100 includes user device 110, network device 120, session initiation protocol (SIP) proxy 130, call centers 140 and 150 and network 160.

User device 110 may include any type of communication or computation device that is capable of transmitting and receiving voice signals and/or data to/from a network, such as network 160. For example, user device 110 may include any standard telephone, cordless telephone, cellular telephone, or other type of conventional telephone that interfaces with a public switched telephone network (PSTN) and/or wireless network to place and receive telephone calls. User device 110 may also include any client, such as a computer device, a web-based appliance, etc., that is configured to provide telephone functions using, for example, voice over Internet protocol (VoIP), H.323 protocol, etc. For example, user device 110 may include a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

User device 110 may further include any type of communication or computation device, such as a PC, laptop computer, tablet computer, personal digital assistant, cell phone, etc., that is capable of transmitting data (e.g., emails, text messages, instant messages, facsimiles, etc.), video data (e.g., video calls, video chats, video messages, etc.) and/or voice data (e.g., voice calls) to/from a network, such as network 160.

Network device 120 may include one or more devices that allow divergent transport networks to communicate and cooperatively carry traffic. For example, network device 120 may include a gateway that provides for interoperation at two levels, e.g., between different signaling schemes and between different media forms. As an example, network device 120 may adapt between SS7 signaling of network 160 and session initiation protocol (SIP), H.323 protocols or other protocols (e.g., Internet protocols (IPs) or Internet based protocols) used by other devices in network 100. In one implementation, network device 120 may convert time division multiplexed (TDM) encoded voice signals to a packetized data stream suitable for transport to and processing by a proxy device, such as SIP proxy 130.

Network device 120 may also include one or more session border controllers (SBCs) that provide control of the boundary between different service provider networks, provide signaling protocol inter-working between an IP-based network and other service provider networks, control the transport boundary between service provider networks, and provide usage metering and Quality of Service (QoS) measurements for media flows. In one implementation, network device 120 may correspond to an ingress point to SIP proxy 130. For example, network device 120 may receive a VoIP call from user device 110 and forward the VoIP call to SIP proxy 130.

SIP proxy 130 may include a server/computing device that is able to receive data from network device 120 and forward the received data to an appropriate voice portal, such as voice portal 142 or 152 (described below) using SIP protocol. In other implementations, SIP proxy 130 may be able to receive and forward data via another protocol, such as H.323.

Call center 140 may represent a call center configured to receive and handle a large volume of calls. Call center 140 may include voice portal 142, automatic call distributor (ACD) 146 and agent workstations (WSs) 148-1 through 148-N (referred to collectively as agent WSs 148 or individually as agent WS 148). Voice portal 142 may represent a front end device associated with call center 140. In an exemplary implementation, voice portal 142 may include interactive voice response (IVR) unit that interacts with callers to obtain information associated with the call, as described in detail below.

ACD 146 may distribute calls received at voice portal 142 to one of agent WSs 148-1 through 148-N. ACD 146 is illustrated as being a separate component that is located externally from voice portal 142. In some implementations, ACD 146 may be part of voice portal 142 (e.g., a sub-component of voice portal 142). In each case, ACD 146 may forward calls to an available one of the agent WSs 148.

Agent WSs 148 may represent a workstation/computer and operator who handles calls from callers that require human intervention. In an exemplary implementation, agent WSs 148 may be associated with voice portal 142 and ACD 146. In addition, in an exemplary implementation, agent WSs 148 may be connected to ACD 146 and/or voice portal 142 via a network, such as network 160. In alternative implementations, agent WSs 148 may be connected directly to ACD 146 and/or voice portal 142, connected via a LAN, connected via a private network, etc.

Agent WSs 148 may include a workstation or computer, such as a personal computer or laptop. Agent WSs 148 may also include any device capable of performing IP based messaging, such as VoIP, to transmit voice, video and/or text. Agent WSs 148 may also include any telephone device (not shown) to place and receive telephone calls. For example, the telephone device may be a standard telephone, a cordless telephone, a cellular telephone or any other type of telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device. In some implementations, agent WSs 148 may include speech recognition hardware/software that receives voice responses from a caller and identifies what the caller has voiced.

Call center 150 may represent another call center designed to receive and handle calls. For example, call center 140 and call center 150 may be associated with the same business entity, but may be designated for handling different types of calls/inquiries. As an example, call center 140 may be designated for handling customer orders and call center 150 may be designated for resolving customer problems. Referring to FIG. 1, call center 150 may include voice portal 152, ACD 156 and agent workstations (WSs) 158-1 through 158-N (referred to collectively as agent WSs 158 or individually as agent WS 158). Voice portal 152, ACD 156 and agent WSs 158 may be configured to operate in a similar manner as voice portal 142, ACD 146 and agent WSs 148, as described above with respect to call center 140.

Network 160 may include one or more wired, wireless and/or optical networks that are capable of receiving and transmitting data and voice signals. For example, network 160 may include one or more public switched telephone networks (PSTNs) or other type of switched network. Network 160 may also include one or more wireless networks and may include a number of transmission towers for receiving wireless signals and forwarding the wireless signals toward the intended destination. Network 160 may further include one or more satellite networks, one or more packet switched networks, such as an Internet protocol (IP) based network, a local area network (LAN), a wide area network (WAN), an intranet, the Internet, or another type of network that is capable of transmitting telecommunications traffic (e.g., voice, video and/or data traffic). For example, network 160 may include one or more SIP-based networks, one or more H.323/H.225-based networks, or any other type of packet switched network that is capable of transmitting traffic from a source device to a destination device.

The exemplary configuration illustrated in FIG. 1 is provided for simplicity. It should be understood that a typical network may include more or fewer devices than illustrated in FIG. 1. For example, one user device 110, one network device 120, one SIP proxy 130, two call centers 140 and 150 and one network 160 are shown for simplicity. It should be understood that network 100 may include a large number (e.g., hundreds or thousands) of user devices, work stations, a number of other networks and/or voice portals. As an example, in one implementation, each of call centers 140 and 150 may include hundreds of agent WSs and multiple ACDs. Further, additional and/or different switching devices, routing devices, etc., involved in routing communications and data between user devices, such as user device 110, and call centers 140 and 150 may be included in network 100. In addition, network 100 may include various components associated with providing call back services to callers/customers, as described in more detail below.

Further, various functions are described as being performed by particular components or devices in network 100. In other implementations, various functions described as being performed by one component/device may be performed by another component/device or various functions described as being performed by multiple components/devices may be combined and performed by a single component or device.

Figure 2:
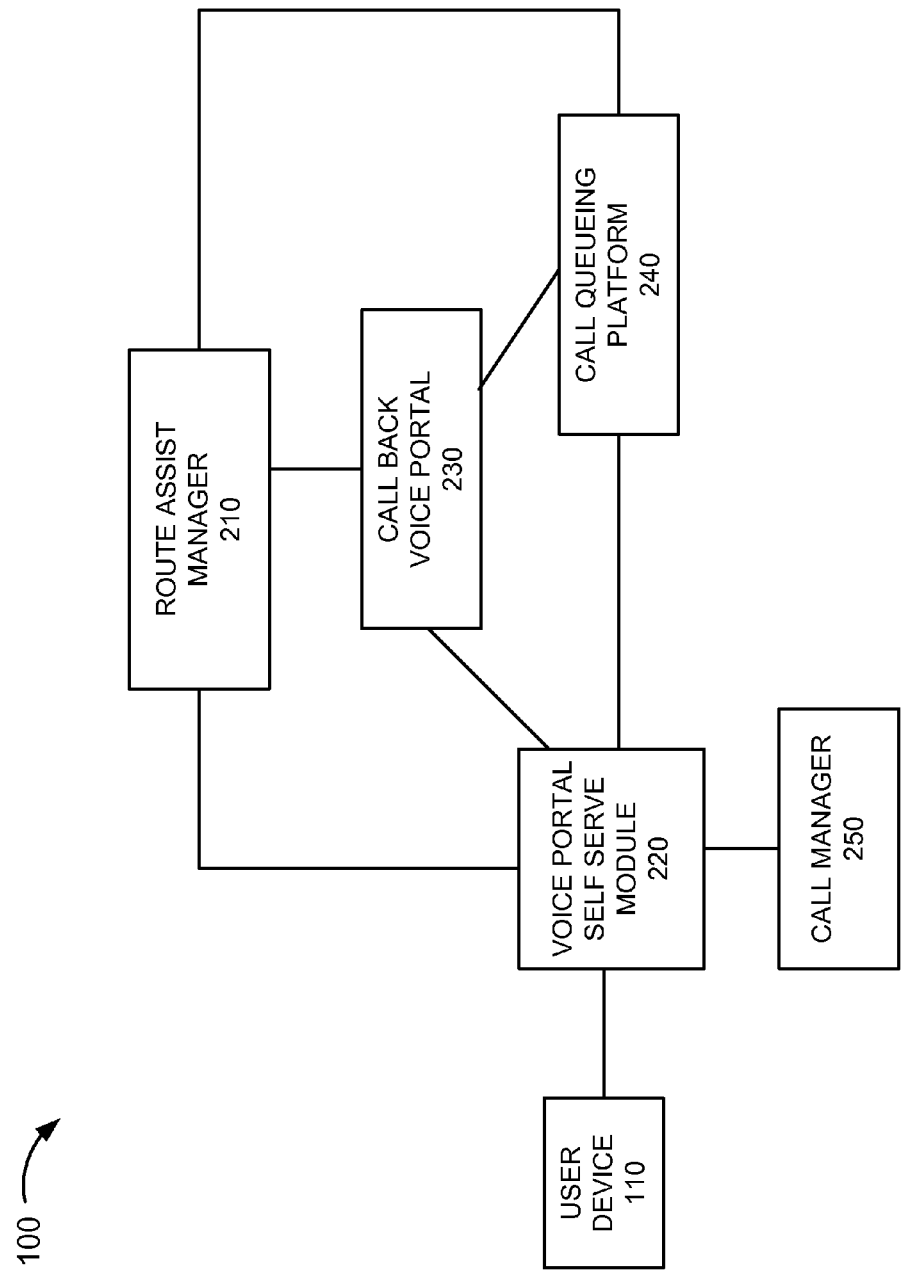
FIG. 2 illustrates additional exemplary components included in the network of FIG. 1

FIG. 2 illustrates exemplary components implemented in network 100. These components are associated with providing call back services in network 100. In an exemplary embodiment, some or all of the components illustrated in FIG. 2 may be implemented in one of call centers 140 or 150, or may be located externally to call centers 140/150. Referring to FIG. 2, network 100 includes route assist manager 210 (also referred to as call back manager 210), voice portal self-serve module 220, call back (CB) voice portal 230, call queuing platform 240 and call manager (CM) 250.

Route assist manager 210 may include one or more computing devices, servers or processors that interacts with voice portal self-serve module 220, CB voice portal 230 and call queuing platform 240 to manage the process for providing call back services to customers. For example, calls from customers are often placed on hold while waiting for an agent to service the call. In an exemplary implementation, route assist manager 210 may include business logic to coordinate the offerings of call backs to customers at a later time. In this manner, customer frustration associated with being placed on hold for a long period of time is reduced.

Voice portal self-serve module 220 may include one or more computing devices, servers or processors that provide initial interaction with a caller. In an exemplary implementation, voice portal self-serve module 220 may be implemented in voice portal 142, voice portal 152, or in another voice portal located externally from a call center. Voice portal self-serve module 220 may receive inbound calls from a gateway device, such as network device 120, SIP proxy 130 (FIG. 1), etc. Voice portal self-serve module 220 may include IVR functionality to provide a customer with the desired information, without requiring interaction with a human agent. Voice portal self-serve module 220 may also determine whether call back functionality is enabled with respect to a particular call center and/or ACD. This information may be used by voice portal self-serve module 220 or another voice portal to offer a call back service to the caller, as described in more detail below.

CB voice portal 230 may include one or more computing devices, server devices or processors associated with offering various call back services to customers, such as an immediate call back when an agent is available, a scheduled call back at a time selected by the caller, etc. CB voice portal 230 may also interface with route assist manager 210 and call queuing platform 240 to ensure proper queuing of calls scheduled for call back.

Call queuing platform 240 may include one or more computing devices, servers or processors associated with queuing calls scheduled for call backs. Call queuing platform 240 may maintain a place in a call queue for "virtual calls." That is, call queuing platform 240 may maintain a place in the call queue for customers that have requested call backs, but are not currently on hold, as described in more detail below.

CM 250 may include one or more computing devices, servers or processors associated with identifying appropriate destinations for calls. For example, based on information obtained by voice portal self-serve module 220, CM 250 may determine an appropriate call center and/or ACD to which the call should be forwarded for further assistance, as described in more detail below.

The exemplary configuration illustrated in FIG. 2 is provided for simplicity. It should be understood that a typical network may include more or fewer devices than illustrated in FIG. 2. For example, network 100 may include multiple route assist managers 210, voice portal self-serve modules 220, CB voice portals 230, call queuing platforms 240 and CMs 250. Further, various functions are described as being performed by particular components/devices in FIG. 2. In other implementations, various functions described as being performed by one component/device may be performed by another component/device or various functions described as being performed by multiple components/devices may be combined and performed by a single component/device.

Figure 3:
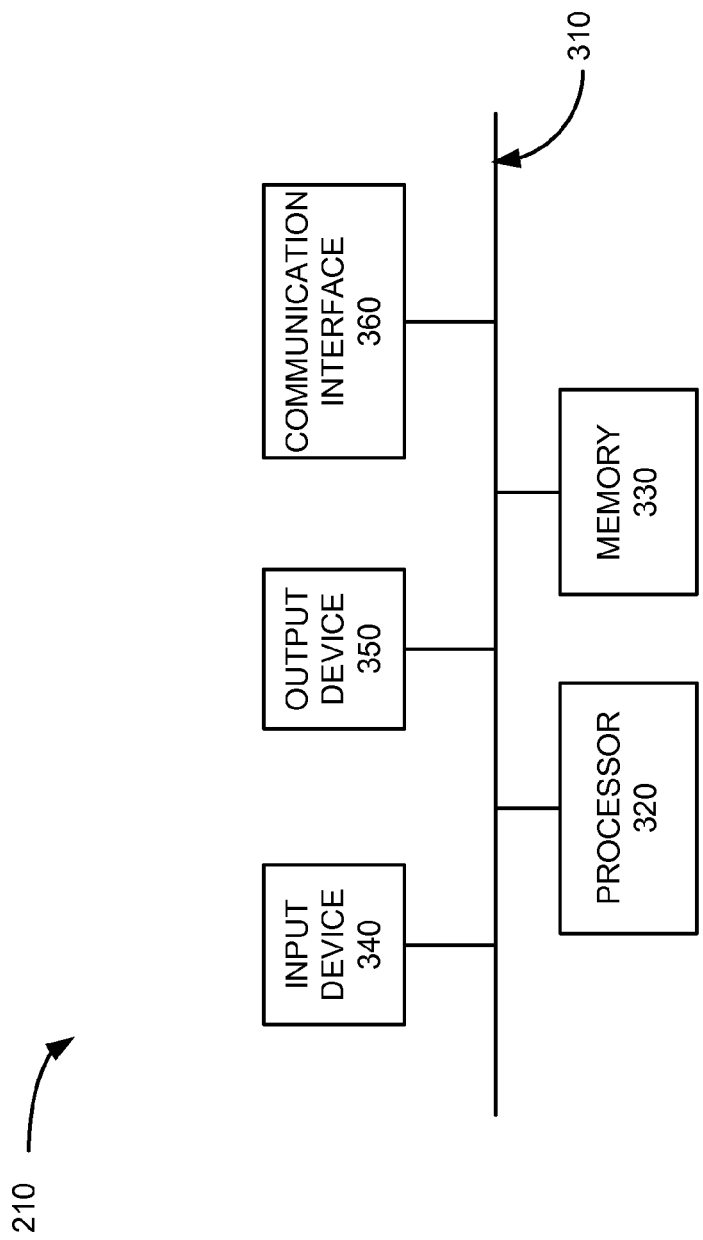
FIG. 3 illustrates an exemplary configuration of one or more of the components of FIGS. 1 and 2.

FIG. 3 illustrates an exemplary configuration of route assist manager 210. Other devices in network 100, such as voice portal self-serve module 220, CB voice portal 230, call queuing platform 240 and CM 250 may be configured in a similar manner. In addition, other devices illustrated in FIG. 1, such as user device 110, network device 120, SIP proxy 130, voice portals 142 and 152, ACDs 146 and 156 and agent workstations 148 and 158 may be configured in a similar manner. Referring to FIG. 3, route assist manager 210 may include bus 310, processor 320, memory 330, input device 340, output device 350 and communication interface 360. Bus 310 may include a path that permits communication among the elements of route assist manager 210.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to route assist manager 210, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD), a printer, a speaker, etc.).

Communication interface 360 may include a transceiver that route assist manager 210 may use to communicate with other devices (e.g., voice portal self-serve module 220, CB voice portal 230, call queuing platform 240, CM 250, etc.) via wired, wireless or optical mechanisms. Communication interface 260 may also include one or more radio frequency (RF) transmitters, receivers and/or transceivers and one or more antennas for transmitting and receiving RF data via network 160. Communication interface 360 may also include a modem or an Ethernet interface to a LAN or other mechanisms for communicating with elements in a network, such as network 160 or another network.

The exemplary configuration illustrated in FIG. 3 is provided for simplicity. It should be understood that call back manager 210 (voice portal self-serve module 220, CB voice portal 230, call queuing platform 240, CM 250, user device 110, network device 120, SIP proxy 130, voice portals 142 and 152, ACDs 146 and 156, agent WSs 148 and 158, etc.) may include more or fewer devices than illustrated in FIG. 3. In an exemplary implementation, route assist manager 210 (or other devices illustrated in FIGS. 1 and 2) may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
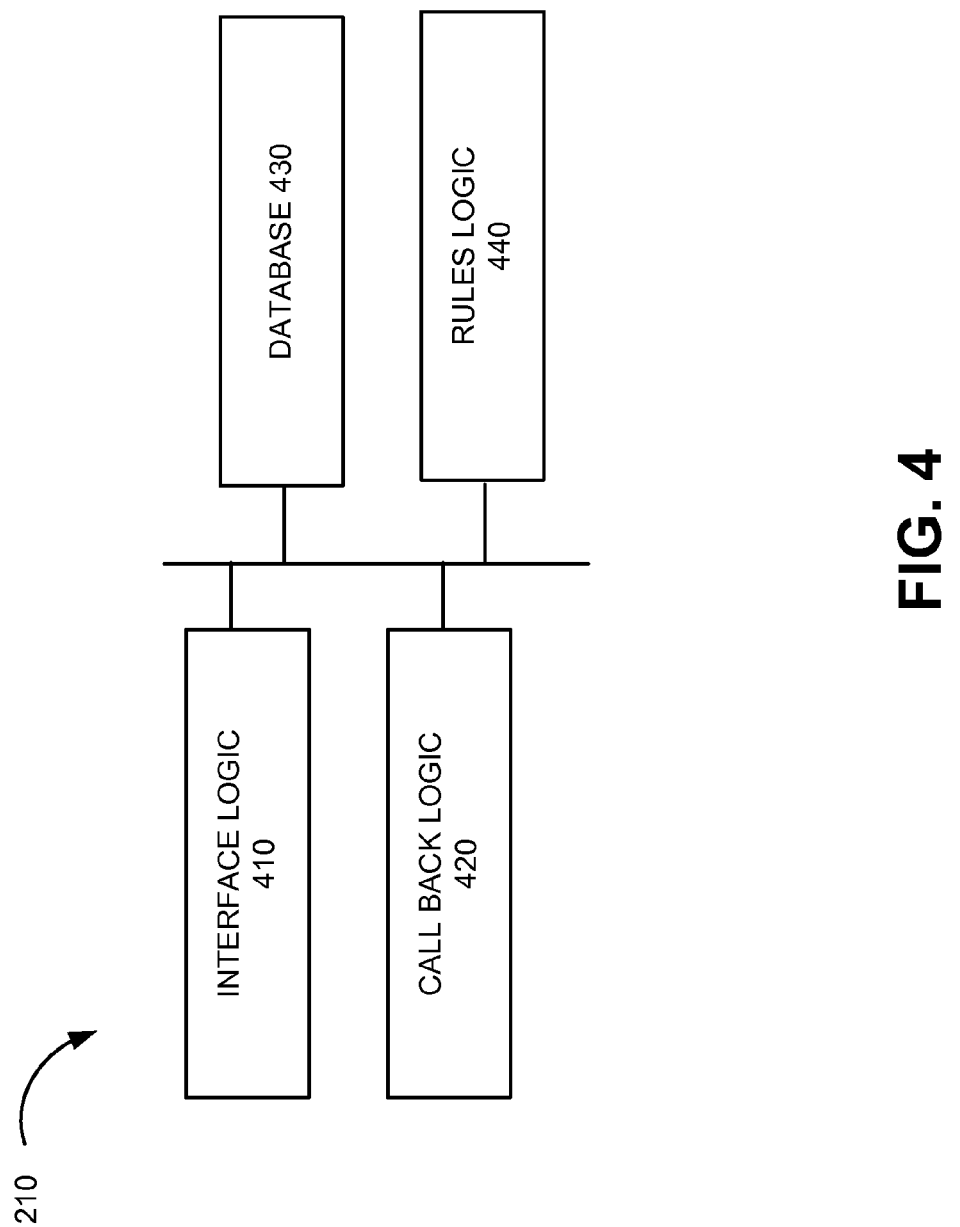
FIG. 4 illustrates an exemplary configuration of logic components implemented in one or more of the components of FIGS. 1 and 2.

FIG. 4 is a functional block diagram of route assist manager 210 according to an exemplary implementation. The logical blocks illustrated in FIG. 4 may be implemented in software, hardware, or a combination of hardware and software. For example, some or all of the logical blocks illustrated in FIG. 4 may be implemented by processor 320 executing instructions stored in memory 330. In one implementation, route assist manager 210 may be located within a call center, such as call center 140. In other implementations, route assist manager may be located externally with respect to a call center.

Referring to FIG. 4, route assist manager 210 may include interface logic 410, call back logic 420, database 430 and rules logic 440. Interface logic 410 may include a front end that receives information associated with calls, such as information from voice portal self-serve module 220 and CB voice portal 230.

Call back logic 420 may use the information received from voice portal self-serve module 220 to determine whether the destination associated with the call includes call back functionality. For example, based on a label or other information, which is forwarded to route assist manager 210 and which identifies a destination call center and/or ACD within a particular call center, call back logic 420 may determine whether call back functionality is enabled at the destination call center and/or ACD. Call back logic 420 may access database 430 to determine whether the destination call center/ACD includes call back functionality/capabilities.

Database 430 may include information identifying particular call centers and/or ACDs that include call back functionality. This information may be updated over time as additional call centers and ACDs are added to a service provider's call center network and/or ACDs are upgraded to include call back functionality Rules logic 440 may include logic that manages the business rules for call backs, integrates call back functionalities with other systems of a service provider associated with managing call centers 140 and 150 and generates reports associated with call back metrics.

Figure 5:
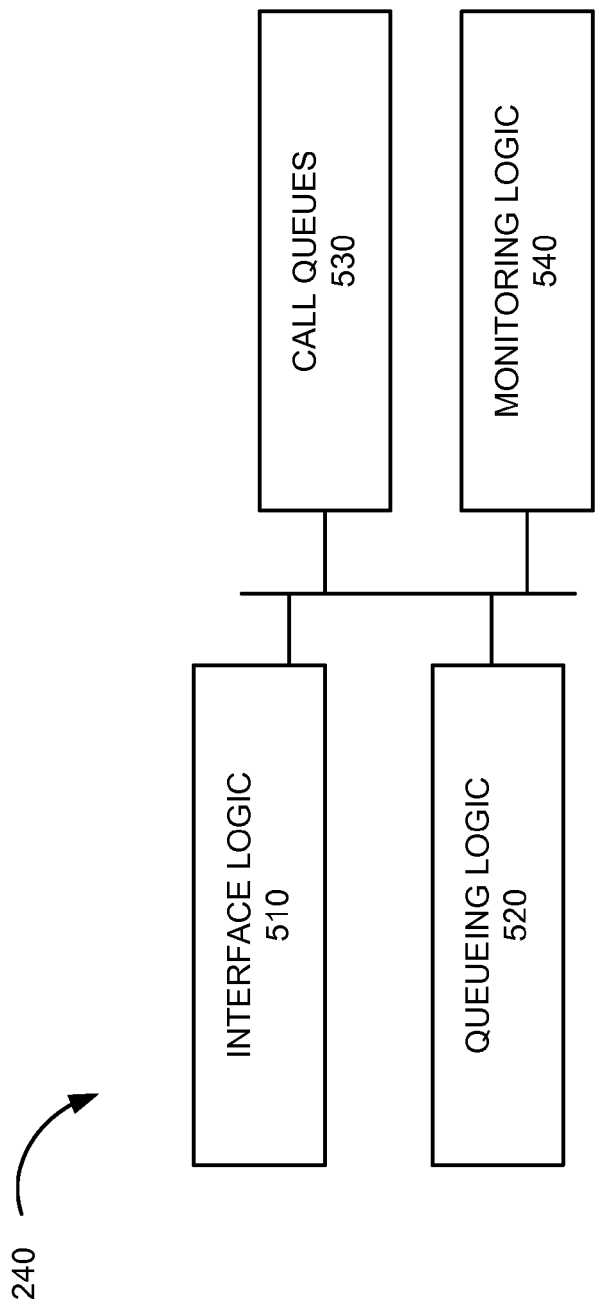
FIG. 5 illustrates an exemplary configuration of logic components implemented in another one or more of the components of FIGS. 1 and 2.

FIG. 5 is a functional block diagram of call queuing platform 240 according to an exemplary implementation. The logical blocks illustrated in FIG. 5 may be implemented in software, hardware, or a combination of hardware and software. For example, some or all of the logical blocks illustrated in FIG. 5 may be implemented by processor 320 executing instructions stored in memory 330. In one implementation, the logical blocks illustrated in FIG. 5 are implemented in call queuing platform 240. It should be understood that the logical blocks illustrated in FIG. 5 may be located in other components of network 100 (e.g., route assist manager 210, CB voice portal 230, etc.) in other implementations.

Referring to FIG. 5, call queuing platform 240 may include interface logic 510, queuing logic 520, call queues 530 and monitoring logic 540. Interface logic 510 may include a front end that receives calls to be queued, as well as information indicating whether call back functionality is enabled at a call center/ACD. Queuing logic 520 may include logic that determines an appropriate queue in which to place a call. For example, queuing logic 520 may identify particular skills needed to service a call, whether a call requires an agent with an internal quality rating above a certain level, whether an agent that handled a previous call from a caller should be used to handle a current call from that same customer, etc.

Call queues 530 may include a number of queues. For example, as described above, call queues 530 may include separate queues for different types of calls, such as queues for billing problems, queues for new orders, queues for troubleshooting service problems, etc. In other words, call queues 530 may include separate skill-based queues associated with skills of agents needed to service the calls. In addition, call queues 530 may include queues that require calls to be handled by agents of different agent ratings, queues for individual agents, etc.

Monitoring logic 540 may include logic to monitor call queues 530. For example, monitoring logic 540 may monitor both calls that are on hold waiting to be serviced, as well as "virtual" calls that represent call backs to be made to callers, as described in detail below.

Figure 6:
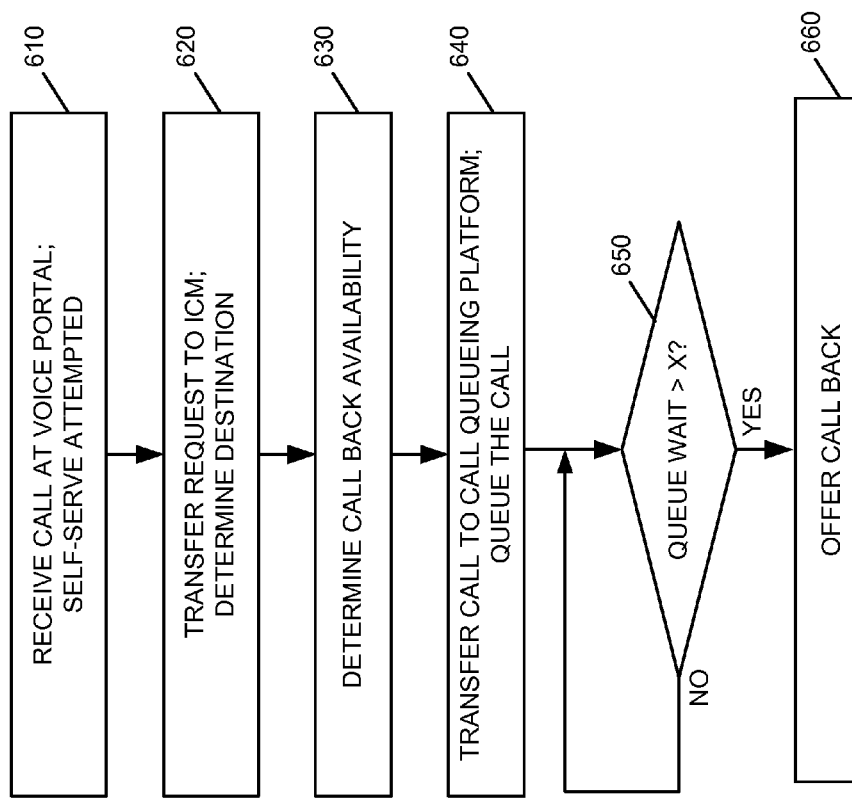
FIG. 6 is a flow diagram illustrating exemplary processing associated with offering a call back service.

FIG. 6 is a flow diagram illustrating exemplary processing associated with offering call back services in network 100. Processing may begin with a caller at user device 110 establishing communications with call center 140. For example, a caller (also referred herein as a customer or a user) at user device 110 may call a telephone number associated with call center 140 (e.g., voice portal 142) or enter an Internet address associated with call center 140. In each case, voice portal self-serve module 220, which may be implemented within voice portal 142, may receive the call (block 610).

Voice portal self-serve module 220 may attempt to fulfill the customer's request via interaction with an IVR module included within voice portal self-serve module 220 (block 610). For example, voice portal self-serve module 220 may provide an automated greeting to the customer at user device 110, provide a menu of options to determine the reason or nature of the call and audibly request that the customer voice or input a selection via a keypad. If voice portal self-serve module 220 is unable to provide the requested service or resolve the customer's inquiry, voice portal self-serve module 220 may send a transfer request to CM 250 (block 620).

CM 250 may receive the transfer request and determine the appropriate destination for the transfer (block 620). For example, the transfer request may include information identifying the customer's request obtained via interaction with the IVR module. In this case, CM 250 may identify whether the ACD associated with the destination call center, such as ACD 146, queues calls for agents capable of handling the call (block 620). For example, CM 250 may access a database (not shown in FIG. 2) for information identifying call centers, ACDs and the types of calls handled by each call center and/or ACD.

CM 250 may provide information to voice portal self-serve module 220 identifying a destination ACD that will forward the call to an appropriate agent capable of handling the call. Voice portal self-serve module 220 may also query route assist manager 210 to determine whether call back functionality is enabled for the destination ACD (block 630). For example, some call centers and/or ACDs may not include call back functionality. Voice portal self-serve module 220 may forward the query to route assist manager 210 along with information identifying the destination call center/ACD. Route assist manager 210 may return information to voice portal self-serve module 220 indicating whether CB functionality is available for the destination ACD.

Voice portal self-serve module 220 may then transfer the call to call queuing platform 240 (block 640). Call queuing platform 240, as described above, may be located in the destination call center, such as call center 140 and may be located within a particular voice portal, such as voice portal 142. In other cases, call queuing platform 240 may be located externally with respect to an individual call center. In each case, call queuing platform 240 may queue the call for a next available agent capable of servicing the call. For example, call queuing platform 240 may access a database of information identifying agents along with the agents' skills and capabilities.

For example, FIG. 7A illustrates an exemplary table 700 stored in, for example, call queuing platform 240. Referring to FIG. 7A, table 700 may include agent field 702, rating field 704, skill field 706, status field 708 and location field 710. Agent field 702 may store information identifying a name or other identifier associated with an agent. Rating field 704 may store a rating associated with the agent identified in agent field 702. For example, entry 720 indicates that agent Joe Smith has an agent rating of 89. This rating may be based on supervisors monitoring calls handled by the agent (i.e., Joe Smith in this example), the number or lack of complaints regarding the agent, the average time taken by the agent on each call, etc.

Skill field 706 may identify particular skills associated with an agent, such as types of calls the agent is able to handle (e.g., orders, billing-related, troubleshooting, etc.), whether the agent speaks more than one language, etc. For example, field 706 of entry 720 indicates that agent Joe Smith can handle order-related issues and billing-related issues.

Status field 708 may store information identifying a current state or status of the agent identified in field 702, such as "on call," "available," "not available/not logged in," etc. Location field 710 may store information identifying a location of the agent, such as an agent workstation location.

Call queuing platform 240 may use table 700 to queue the call for an agent that is available and able to handle the call. For example, if the call involves a billing related issue, call queuing platform 240 may queue the call in a queue in call queues 530 that is associated with billing related issues. Call queuing platform 240 may then identify an agent, such as agent Joe Smith, as having the skill to handle the call and therefore, being an agent to whom the call can be transferred. Call queuing platform 240 may also determine whether a call from a repeat caller should be forwarded to a particular agent. For example, call queuing platform 240 may attempt to identify an agent that most recently interacted with the caller using table 750 illustrated in FIG. 7B.

Referring to FIG. 7B, table 750 may include telephone number field 712, name field 714, last agent field 716 and other field 718. Telephone number field 712 may store one or more telephone numbers associated with a customer. Name field 714 may store a name of the customer associated with the telephone number in field 712. Last agent field 716 may include an agent identifier and/or an agent name associated with the agent who handled the most recent previous call associated with the customer identified in field 714. Other field 718 may store additional information associated with the call, such as the date of the last call from the caller associated with the telephone number in field 712 (or the number of days from the previous call), the nature or reason associated with the previous call, etc. For example, entry 760 in table 750 indicates that the telephone number 555-742-1234 is associated with customer Bill Jones, that the last agent handling a call from Bill Jones was Agent 0146, which corresponds to agent Joe Smith, and that the last call was received on Oct. 7, 2013 and involved a new order. The information stored in table 750 may be used to queue the call to an agent that handled the caller's previous call. In this case, call queuing platform 240 may queue the call in a queue in call queues 530 that corresponds to agent Joe Smith. In some instances, call queuing platform 240 or self-serve voice portal 220 may query the caller to determine whether the caller would like to have the agent with whom the caller previously interacted handle the current call.

Assume that no agent is available to handle the call at the current time. Call queuing platform 240 may queue the call in a queue in a queue in call queues 530 corresponding to the type of call/skill set needed to service the call (block 640). Call queuing platform 240 may also monitor the queue and determine whether the call has been queued for more than a predetermined period of time (i.e., on hold waiting for an agent for longer than the period of time) (block 650). For example, the predetermined period of time may be one minute, two minutes, five minutes, etc. If the call has not been queued for the predetermined period of time (block 650—no), call queuing platform 240 may continue to monitor the queue time.

If, however, call queuing platform 240 determines that the call has been queued for more than the predetermined period of time (block 650—yes), and call back functionality is enabled for the particular destination call center/ACD, call queuing platform 240 may interact with the caller via an IVR unit to determine whether the customer would like to receive a call back, as opposed to remaining on hold (block 660). For example, call queuing platform 240 may inquire via the IVR unit whether the caller would like to receive a call back at some later time, instead of remaining on hold. If the caller responds that he/she would like a call back, call queuing platform 240 may signal CB voice portal 230 to schedule a call back, as described in detail below.

Figure 8:
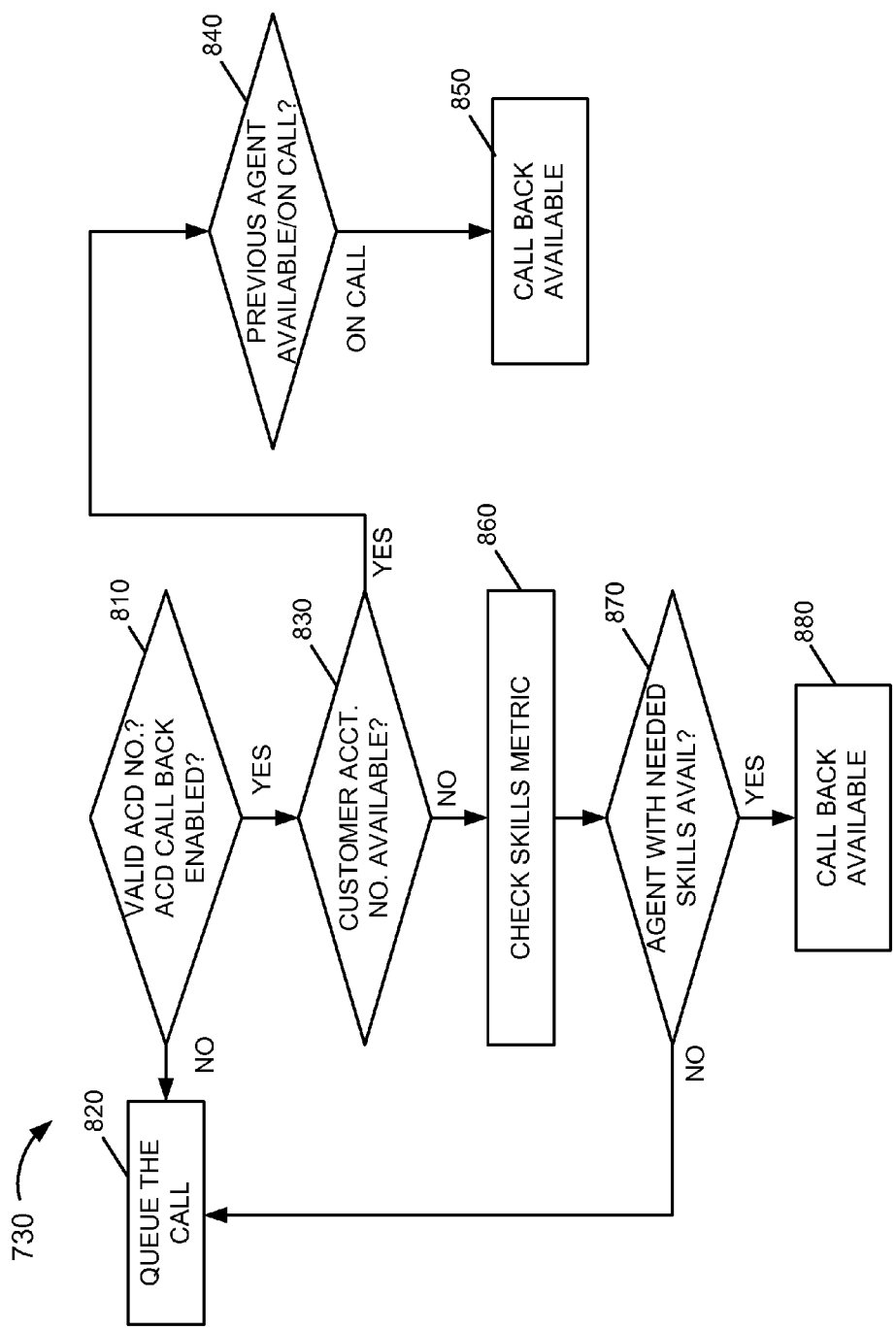
FIGS. 8-10 are flow diagrams illustrating exemplary processing associated with providing call back services.

FIG. 8 illustrates exemplary processing associated with determining whether call back functionality, described above (FIG. 6, block 630), is available/enabled for a particular destination. Processing may begin with route assist manager 210 determining whether the identified ACD to which the call will be forwarded is valid (block 810). For example, CM 250 may provide an ACD number to voice portal self-serve module 220 in response to a request for call transfer information when voice portal self-serve module 220 is unable to service the call. Route assist manager 210 may also determine whether the ACD/call center to which the call is destined includes call back functionality (block 810). If the ACD number is not valid, or the appropriate ACD/call center does not include call back functionality, route assist manager 210 may signal voice portal self-serve module 220 to forward the call to call queuing platform 240 to queue the call for the next available agent at, for example, call center 140 and also indicate that call back services are not available for this call (block 820). Call queuing platform 240 may then mark the call in the queue to ensure that call back services are not offered to the caller.

If the ACD number is valid and call back functionality is enabled for the appropriate ACD (block 810—yes), route assist manager 210 may determine whether the call is from a caller with a customer account number (block 830). For example, a caller may be a subscriber to services (e.g., telephone services, Internet services, cable television services) offered by a service provider associated with call center 140. In this case, the caller may be identified based on the calling telephone number. The calling telephone number may correspond to a billing telephone number (BTN), or may be used to identify a customer account number. For example, voice portal self-serve module 220 may include an automatic number identification (ANI) system that determines the telephone number associated with an incoming call, which may correspond to the BTN of the customer. In some implementations, voice portal self-serve module 220 may also include logic to identify an address, such as an IP address, associated with an incoming call made from a computer device. In each case, voice portal self-serve module 220 may determine whether the calling telephone number is from a customer with a customer account number.

If the request is from a customer with a customer account number (block 830—yes), voice portal self-serve module 220 may forward the customer account number with a query to route assist manager 210. Route assist manager 210 may then determine whether an agent that handled a most recent call from the caller is available (block 840). For example, route assist manager 210 may access table 750 and determine that the customer's previous interaction with call center 140 was with agent Jill Brown on Jan. 8, 2014 and the outcome was favorable (based on, for example, a survey taken by the caller after the call). In this case, route assist manager 210 may determine whether the previous agent (i.e., Jill Brown in this example) in on a call, available or not logged in (block 840). If the previous agent is currently handling another call, (block 840—on call), route assist manager 210 may signal call queuing platform 240 to indicate that call back services are available (block 850).

If the call information does not include a customer account number (block 830—no), route assist manager 210 may access a skills matrix to determine if an agent is currently on duty with the proper skills to service the call (block 860). For example, the particular call may involve details regarding the customer's Internet service and the call information may indicate that the caller would like to converse in a foreign language (e.g., Spanish, French, etc.).

Route assist manager 210 may access table 700 to determine whether an agent that is on duty (also referred to herein as being online or logged in) has the skill set need to service the call (block 870). If such an agent is online (block 870—yes), route assist manager 210 may signal call queuing platform 240 to indicate that call back services are available (block 880). If no agent with the required skills is online (block 870—no), route assist manager 210 may signal call queuing platform 240 to queue the call and indicate that call back services are not available (block 820).

Figure 9:
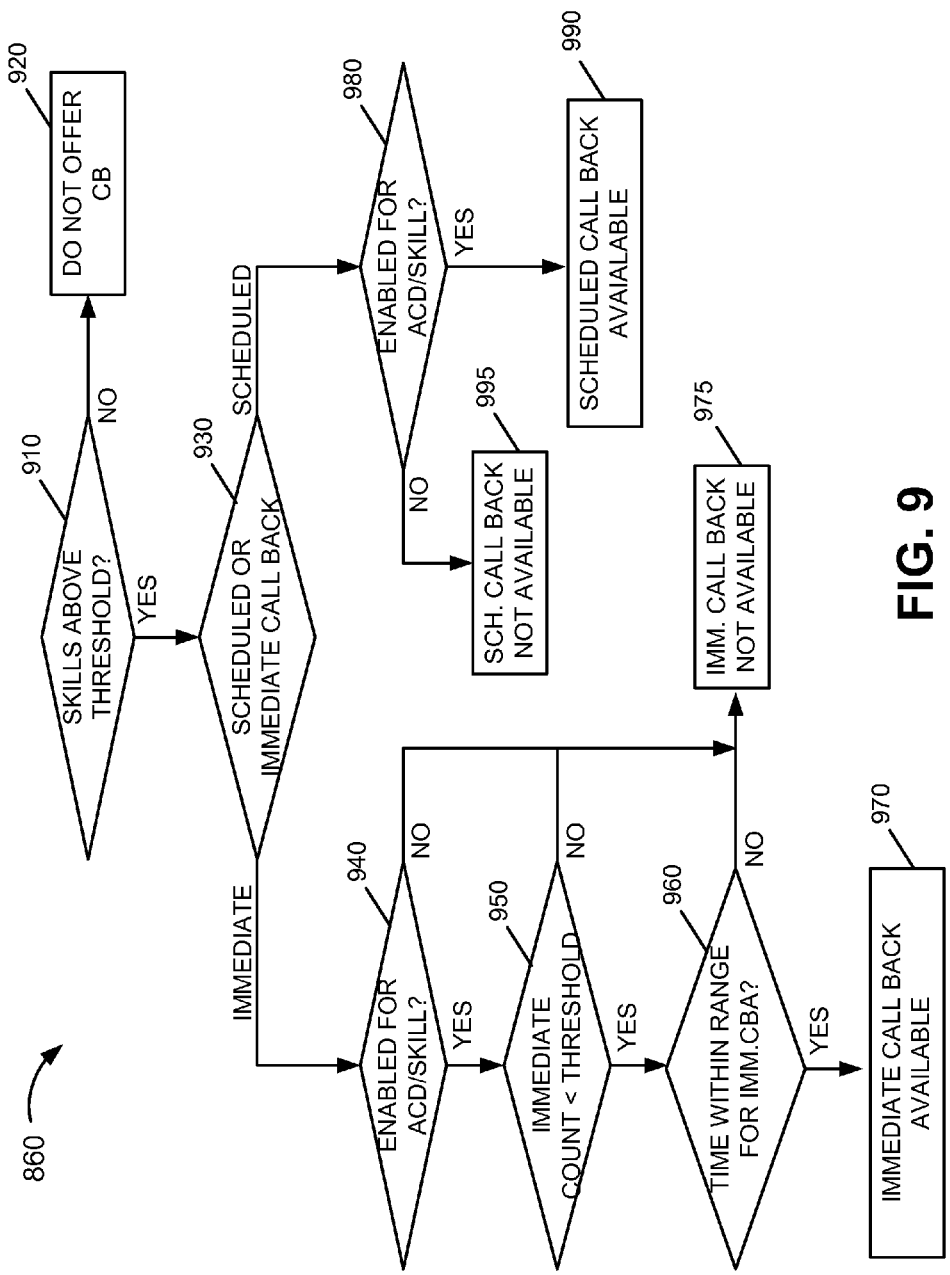

FIG. 9 illustrates exemplary processing associated with checking skills metrics, described above (FIG. 8, block 860), to determine whether call back services should be offered to a customer. Processing may begin with determining whether any agents that are online have skills rated above a threshold requirement (block 910). For example, an agent may be rated on various skills and obtain an overall agent rating, as indicated in rating field 704 in table 700. If the caller is a "premium" customer, such as a customer that purchases a large number of products and/or services from the service provider associated with call center 140, the required agent rating to handle the call may correspond to a very good/excellent rating (e.g. a rating of 85 or above). If no agent with the necessary skills and/or rating is available (block 910—no), route assist manager 210 may signal call queuing platform 240 to not offer call back services for that particular customer (block 920).

If an agent with the necessary rating is online (block 910—yes), route assist manager 210 may determine various additional factors associated with the type of call back to offer, such as an immediate type call back in which the caller will receive a call back from the next available agent, or a scheduled call back in which the caller will receive a call back at a particular time (block 930). For an immediate call back, route assist manager 210 may determine whether an agent that is online is enabled for a particular skill (e.g., speaking a particular foreign language needed to service the call) (block 940). Route assist manager 210 may also determine whether the number of immediate type call backs that are currently queued is less than a threshold number (block 950). For example, in one implementation, route assist manager 210 may allow call queuing platform 240 to schedule only a predetermined number of immediate call backs. This may prevent too many slots in call queues 530 from being taken up by call backs, as opposed to customers waiting on hold for an agent. Route assist manager 210 may further determine whether the current time is within a time range for immediate call backs (block 960). For example, the time for immediate call backs may end at 9:00 PM and start at 9:00 AM to avoid calling a customer too late in the evening or too early in the morning.

If route assist manager 210 determines that an agent with the available skills is online (block 940—yes), the immediate call back count is less than a threshold (block 950—yes) and the time is within the call back time range (block 960—yes), route assist manager 210 may signal call queuing platform 240 to indicate that immediate type call back services are available to the caller (block 970). If route assist manager 210 determines that an agent with the available skills is not online (block 940—no), the immediate call back count is not less than the threshold (block 950—no), or the time is not within the call back time range (block 960—no), route assist manager 210 may signal call queuing platform 240 to indicate that immediate type call back services are not available to the caller (block 975).

For a scheduled call back, route assist manager 210 may determine whether an agent that is online is enabled for a particular skill (e.g., speaking a particular foreign language) (block 980). If route assist manager 210 determines that an agent with the available skills is online (block 980—yes), route assist manager 210 may signal call queuing platform 240 to indicate that scheduled type call back services are available to the caller (block 990). If no agent with the available skills is online (block 980—no), route assist manager 210 may signal call queuing platform 240 to indicate that scheduled call back services are not available to the caller (block 995).

Figure 10:
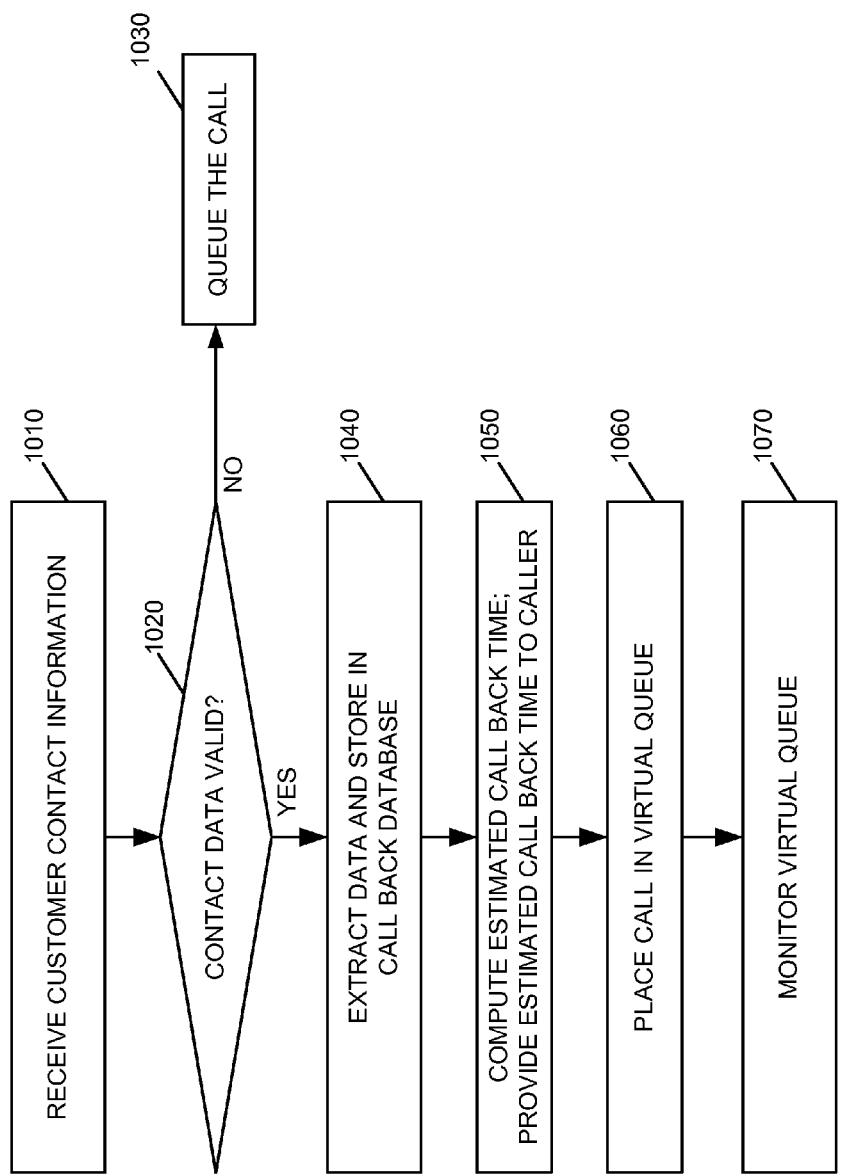

FIG. 10 illustrates exemplary processing associated with performing immediate call back services. Processing may begin with call queuing platform 240 receiving or identifying customer contact information (block 1010). For example, call queuing platform 240 may identify the customer contact information (e.g., name, telephone number, reason for call) or receive this information from another device/system (e.g., route assist manager 210, voice portal self-serve module 220, etc.) in network 100.

Call queuing platform 240 may determine if the call back contact information is valid (e.g., includes a valid 10 digit telephone number) (block 1020). If not (block 1020—no), call queuing platform 240 may maintain the call in the queue and not offer call back services (block 1030). If the contact data is valid (block 1020—yes), call queuing platform 240 may extract data from the request, such as the caller's telephone number, and store the information in a call back database (block 1040). The call back database may include information indicating the caller's telephone number, the reason for the call, and other information, such as the caller's most recent interactions with call center 140.

Call queuing platform 240 may then compute the estimated call back time for an immediate call back. For example, based on the number of callers already queued, including those in the virtual call back queues (discussed in more detail below), the number of agents online, the average duration of call, etc., call queuing platform 240 may estimate when an agent will be available to call back the customer. Call queuing platform 240 may then signal CB voice portal 230 to interact with the caller via an IVR unit (or interact with the caller via an IVR included in call queuing platform 240) to indicate that the customer should expect to receive a call back at the estimated call back time (block 1050).

If the customer replies that a call back is acceptable, call queuing platform 240 may receive the affirmative indication (e.g., from CB voice portal 230) and place the scheduled call back in a virtual queue (block 1060), as described in more detail below. CB voice portal 230 may then monitor the queue to identify when the caller should be called back (block 1070).

Figure 11:
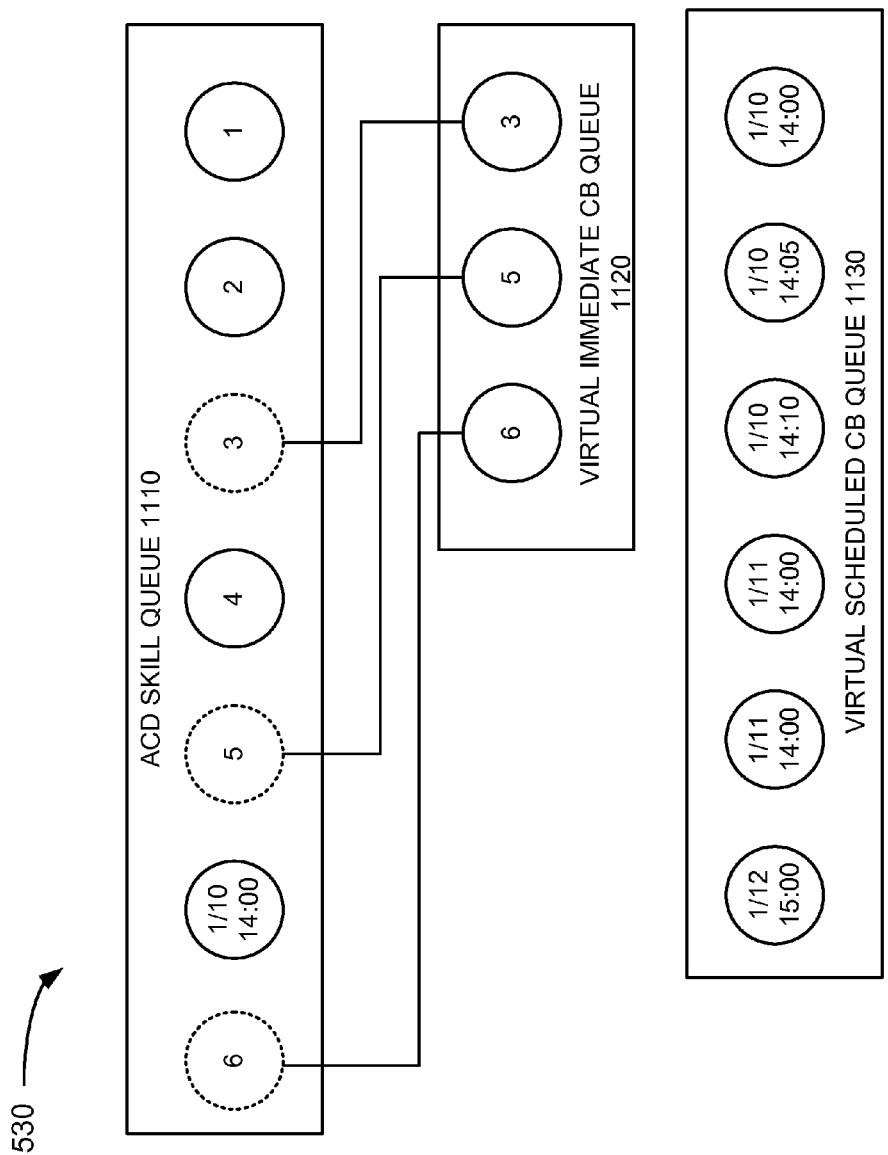
FIG. 11 is an exemplary diagram of queues implemented in the network of FIGS. 1 and 2.

FIG. 11 illustrates one of call queues 530 according to an exemplary implementation. Referring to FIG. 11, call queue 530 includes an ACD skill queue 1110, a virtual immediate CB queue 1120 and virtual scheduled CB queue 1130. As described above, call queues 530 include separate queues for the skills needed to service different types of calls. For example, the skills may include the skills needed to service calls to resolve billing issues, order problems, cable television service problems, Internet service problems, etc. ACD skill queue 1110 represents a queue associated with a particular skill. In this example, assume that ACD skill queue 1110 is associated with agents capable of handling cable television service issues. ACD skill queue 1110 includes six circles numbered 1-6 and a seventh circle labeled "$\frac{1}{10}$ 14:00." The circles labeled 1, 2 and 4 are shown in solid lines and represent actual calls from callers that are on hold and waiting for a next available agent. The circles labeled 3, 5 and 6 and shown via dotted lines represent call backs to be made to callers represented in virtual immediate CB queue 1120. That is, circles 3, 5 and 6 are not actually queued calls, but represent callers to whom an agent will call back when an agent becomes available. That is, call queuing platform 240 queued the immediate call backs described above with respect to FIG. 10 (block 1060) in virtual immediate CB queue 1120. Based on the times at which the original calls from the callers represented by circles 3, 5 and 6 in virtual immediate CB queue 1120 were received, ACD skill queue 1110 reserves relative time slots for the call backs in ACD skill queue 1110. For example, the original call from the caller represented by circle 3 in virtual immediate CB queue 1120 was received after the call represented by circle 2, but before the time represented by circle 4. As a result, call queuing platform 240 reserves a time slot for the virtual call between calls 2 and 4 in ACD skill queue 1110.

The circle in ACD skill queue 1110 labeled "$\frac{1}{10}$ 14:00" represents a scheduled call back to be made to a caller represented in virtual scheduled CB queue 1130. For example, call queuing platform 240 queues scheduled call backs at agreed upon times (described in more detail below) via interaction with the callers. Based on the agreed upon call back time, call queuing platform 240 stores a scheduled call back in virtual scheduled CB queue 1130. For example, referring to queue 1130, six scheduled call backs are stored in virtual scheduled CB queue 1130, starting on January $10^{th}$ at 14:00 (circle located at right side of queue 1130) to January 12th at 15:00 (circle located at left side of queue 1130). Call queuing platform 240 reserves a time slot in ACD skill queue 1110 for each of the scheduled call backs stored in queue 1130. For example, the circle with the label $\frac{1}{10}$ 14:00 located between circles labeled 5 and 6 in queue 110 represents a scheduled call back to be made on January $10^{th}$ at 14:00 hours (i.e., 2:00 PM). Based on the current processing of calls in ACD skill queue 1110, the scheduled call back is placed among other calls that are queued. However, monitoring logic 540 of call queuing platform 240 ensures that the scheduled call backs are performed at the scheduled times and are not delayed based on other calls in queue 110.

Figure 12:
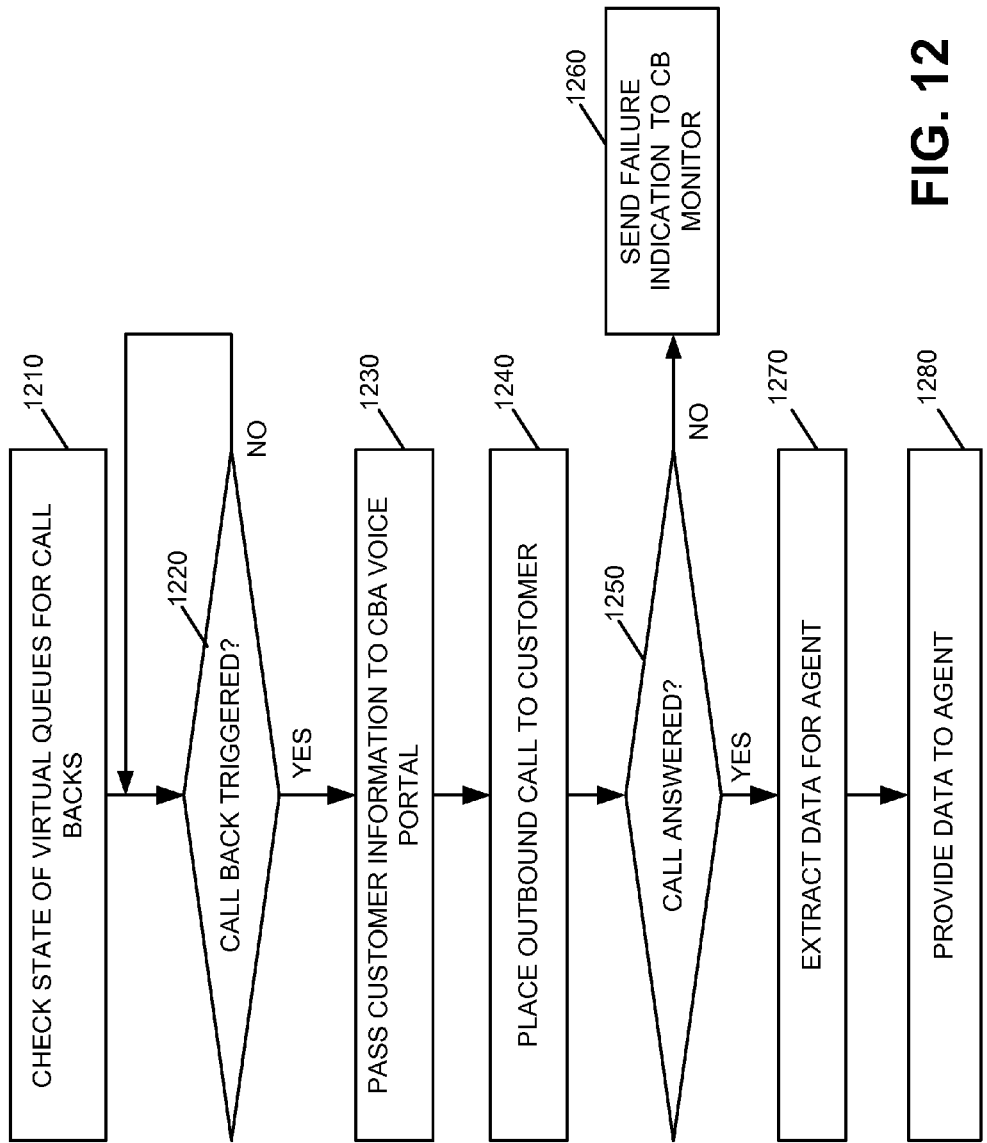
FIGS. 12 and 13 are additional flow diagrams illustrating exemplary processing associated with providing call back services.

FIG. 12 illustrates exemplary processing associated with monitoring the calls in regular queue (e.g., calls actually on hold, such as calls on hold in queue 1110) and the virtual queues (e.g., queues 1120 and 1130). Processing may begin with monitoring logic 540 monitoring virtual queues for scheduled and immediate call backs (block 1210). For example, for each skill-related queue (e.g., virtual immediate CB queue 1120 and virtual scheduled CB queue 1130), monitoring logic 540 may monitor the state of all items in the queues. Monitoring logic 540 may determine whether a call back event is triggered (block 1220). For example, monitoring logic 540 may determine that a current time is equal to a scheduled call back time. For instance, monitoring logic 540 may determine that the current day is January $10^{th}$ and the current time is 14:00. In this case, a virtual scheduled call illustrated by the circle labeled $\frac{1}{10}$ 14:00 triggers a call back event since the current time equals the scheduled call back time (block 1220—yes).

Monitoring logic 540 may then pass customer information associated with the scheduled call to CB voice portal 230 (block 1230). For example, the name of the customer, the telephone number of the customer and details of the call may be passed to CB voice portal 230. CB voice portal 230 will then place an outbound call the customer (block 1240). Alternatively, CB voice portal 230 may signal an agent workstation 148 to automatically place the call to the customer. In either case, CB voice portal 230 may further determine if the call is answered (block 1250). If the call is not answered (block 1250—no), CB voice portal 230 may send a failure indication to call queuing platform 240 (block 1260). CB voice portal 230 may also leave an automated message to the customer to reschedule the call back.

If, however, the call is answered (block 1250—yes), CB voice portal 230 may extract data associated with the call for the agent (block 1270). CB voice portal 230 may then provide the customer information to the agent workstation 148 handling the call (block 1280). For example, the information may be "popped" to the agent workstation 148 for automatic display. It should be understood that the information popped to agent workstation 148 is provided concurrently with or before the actual call is made to ensure that the agent is ready to service the call when the call is answered by the customer.

Figure 13:
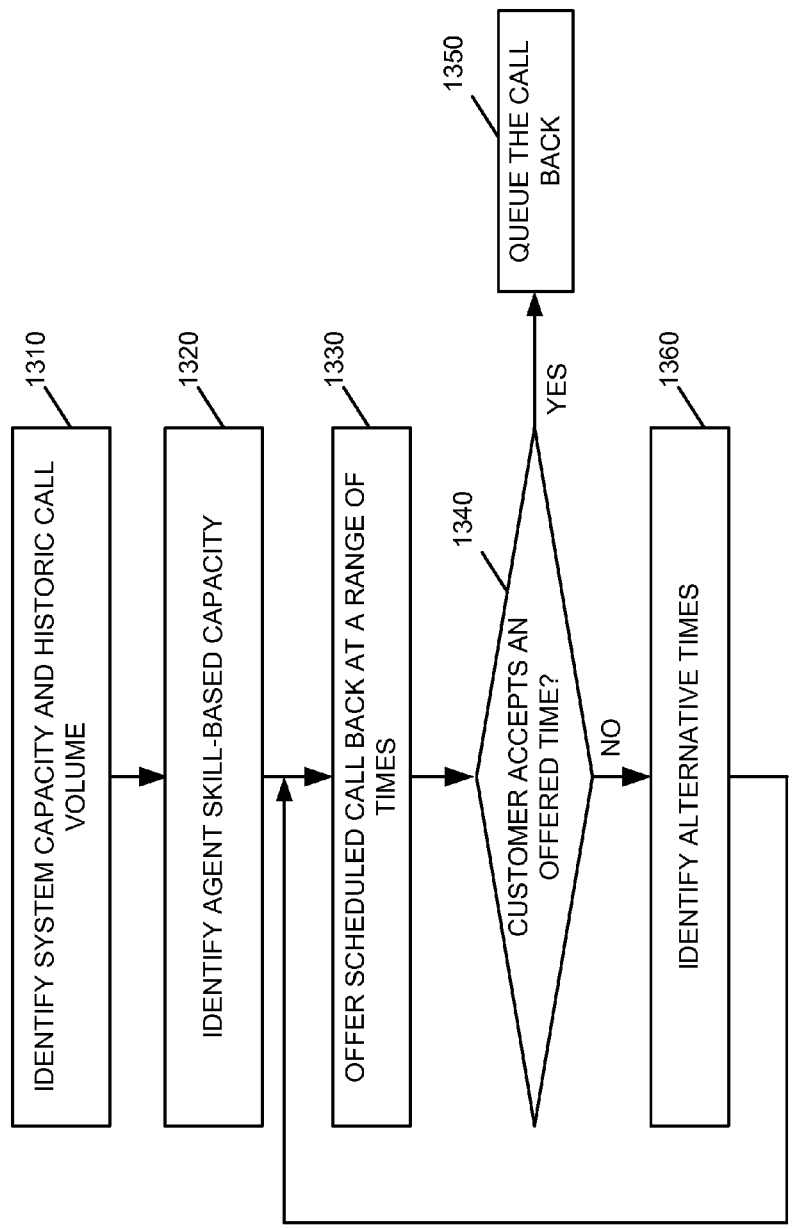

As discussed above, call backs may be immediate type call backs or scheduled type call backs. FIG. 13 illustrates exemplary processing associated with scheduled call backs. Processing may begin with call queuing platform 240 identifying system capacity and historic call volumes for various periods of time (block 1310). For example, call queuing platform 240 may interact with route assist manager 210 to identify historic call volumes during various times of day, days of the week, months of the year, etc. Call queuing platform 240 may also identify whether any new products or services have been released, or other events have occurred recently that may cause a short term spike in calls from customers.

Call queuing platform 240 may also access customer profile information associated with the caller to attempt to identify optimum call back times for that customer. For example, if the caller is a valuable customer (e.g., purchases a large number of products/services), call queuing platform 240 may interact with route assist manager 210 to determine when that customer typically contacts call center 140. As an example, if the customer typically contacts call center 140 between 8:00 AM and 8:30 AM, call queuing platform 240 may attempt to offer a scheduled call back during the period of time from 8:00 AM to 8:30 AM. In some instances, the customer's profile may include information identifying a customer-provided call back time period. In either case, call queuing platform 240 may leverage historic information or other profile information to offer a scheduled call back time likely to be preferred by the customer.

Call queuing platform 240 may also identify agent capacity on a per skill level (block 1320). For example, call queuing platform 240 may interact with route assist manager 210 to identify the work force availability and scheduling of the number of agents with particular skills based on the time of day, day of the week, etc. For example, call queuing platform 240 may interact with route assist manager 210 to identify the number of agents online during various periods of times, days of the week, etc.

Call queuing platform 240 may then offer scheduled call back times to the customer, or ranges of times, at which a call back may be scheduled (block 1330). For example, call queuing platform 240 may signal CB voice portal 230 to interact with the customer (or interact with the caller via an IVR included in call queuing platform 240) to offer a number of times/days for scheduling a call back. If the customer accepts one of the offers (block 1340—yes), call queuing platform 240 may queue the call in one of the virtual queues (block 1350). For example, call queuing platform 240 may queue the call in virtual scheduled CB queue 1130 (FIG. 11).

If the customer replies that none of the offered times is acceptable (block 1340—no), call queuing platform 240 may identify other times, based on work force scheduling, historic call volumes, etc., and offer these new times to the caller (block 1330). If the customer accepts one of the newly offered times (block 1340—yes), call queuing platform 240 may schedule the call (block 1350). In some implementations, if the customer does not accept any offered times, CB voice portal 230 may query the customer to provide a time of his/her choosing and schedule the call back at that time.

In addition, if the user would like to schedule a call back with the agent that handled the customer's most recent call, CB voice portal 230 may provide available times for that agent and negotiate with the caller to select one of that agent's available times or time ranges. CB voice portal 230 may then store the scheduled call back in a virtual queue associated with the agent that handled the customer's most recent call.

Implementations described herein relate to offering call back services to customers that contact a call/contact center, as opposed to having the customer wait on hold for a long period of time. In one implementation, a customer may be able to schedule a call back at a time in which he/she will be available or agree to receive a call back when a next available agent is available to service the call. This may reduce customer frustration associated with communication with a call/contact center.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

Although the implementations have been described above with respect to receiving telephone calls at a call center, in other implementations, other types of communications may be received at a call center or a contact center. For example, in other implementations, a contact center may receive video calls, video chats, electronic mail messages, calls via a mobile application for contacting a call center/contact center, text messages, instant messages or chats, facsimile messages, or any other type of communication. In still further implementations, an e-commerce website may receive a communication from a customer via, for example, an application executed on a mobile device or other computer device, etc. In each case, the communication may be handled in the same manner as described above. That is, the customer may be given an option to negotiate with the call center, contact center, e-commerce website, etc., and receive a return communication (e.g., chat session, communication via a mobile device, etc.) when an agent is available or schedule a return communication session.

In addition, features have been mainly described above with respect to receiving a telephone call via a user device 110. As described above, user device 110 may be a SIP-based telephone. In such instances, queuing of call backs may be handled as described above. In addition, in instances involving SIP-based calls, SIP headers may be used to convey information to various devices in network 100. For example, information identifying a destination call center/ACD, a reason for a call, a customer's account number, etc., may be provided in the SIP header of various SIP messages associated with processing a call that cannot be serviced via voice portal self-serve module 220.

Still further, features have been mainly described above with respect to a particular type of call/contact center. It should be understood that call/contact centers 140 and 150 may be associated with any type of merchant or service provider that may use a call/contact center to provide services to customers.

In addition, while series of acts have been described with respect to FIGS. 6, 8-10, 12 and 13, the order of the acts may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, at a call center, a call from a customer;
attempting to service the call via an automated voice response system;
determining, in response to failing to service the call, a destination for the call;
determining, based on the destination, whether call back services are available for the call based on the destination;
determining whether the customer has previously called the call center;
identifying, in response to determining that the customer has previously called the call center, a first agent that handled the previous call from the customer;
determining whether the first agent is capable of servicing the call, has an agent rating above a threshold value and is on duty;
queuing the call for the first agent, in response to determining that the first agent is capable of servicing the call, has an agent rating above the threshold value and is on duty;

queuing the call for another agent, in response to determining that the first agent is not capable of servicing the call, has an agent rating below the threshold value or is not on duty;
determining whether the call has been queued for at least a predetermined period of time;
interacting with the customer via an interactive voice response unit, in response to determining that the call has been queued for at least the predetermined period of time, to offer a call back service to the customer, wherein the call back service comprises at least one of a scheduled call back or an immediate type call back;
receiving, from the customer and via the interactive voice response unit, an indication that the customer would like a call back; and
queuing the call back.

2. The method of claim 1, wherein the receiving from the customer an indication that the customer would like a call back comprises:
receiving an indication that the customer would like an immediate type call back, the immediate type call back corresponding to a call back at a time when a next agent is available, and wherein queuing the call back comprises:
providing, in a queue, a call back identifier indicating a relative location in the queue, corresponding to an order in relation to other calls in the queue, at which to call the customer.

3. The method of claim 2, further comprising:
determining, for the immediate type call back, an estimated call back time; and
providing the estimated call back time to the customer.

4. The method of claim 1, wherein the receiving an indication from the customer comprises:
receiving an indication that the customer would like a scheduled call back, and wherein queuing the call back comprises:
providing, in a queue, a call back identifier indicating a time at which to call the customer.

5. The method of claim 4, further comprising:
interacting, with the customer via the interactive voice response unit, to schedule the time for the scheduled call back.

6. The method of claim 5, wherein the interacting with the customer to schedule the time for the scheduled call back comprises:
identifying available times to call the customer based on historic call volume information and a number of agents on duty at various periods of time; and
offering a range of available times to the customer for the scheduled call back.

7. The method of claim 6, wherein the identifying available times further comprises:
accessing profile information associated with previous calls from the customer; and
offering a range of available times based on the profile information.

8. The method of claim 1, further comprising:
queuing calls for a plurality of customers in a skill based queue, and
wherein queuing the call back comprises:
providing, in the skill based queue, a call back identifier indicating a relative location in the skill based queue at which to call the customer for an immediate type call back or a time at which to call the customer for a scheduled call back.

9. The method of claim 8, wherein the providing a call back identifier comprises:
inserting, for the immediate type call back, the call back identifier in the skill based queue based on a time at which the call from the customer was received.

10. The method of claim 1, further comprising:
automatically calling the customer at a scheduled call back time for a scheduled call back.

11. The method of claim 1, further comprising:
automatically calling the customer when a queued call back identifier corresponds to a next call to be made for an immediate type call back.

12. The method of claim 11, wherein the automatically calling comprises:
automatically initiating the call from an agent workstation.

13. A system, comprising:
a queue configured to store information identifying a plurality of calls that are on hold waiting to be serviced by one of a plurality of agents;
a first voice portal configured to:
receive a call from a customer,
attempt to service the call via an automated voice response system, and
determine, in response to failing to service the call, a destination for the call;
at least one computing device configured to:
determine, based on the destination, whether call back services are available for the call based on the destination,
access a first memory to determine whether the customer has previously called the call center,
identify, in response to determining that the customer has previously called the call center, a first agent that handled the previous call from the customer,
determine, based on information stored in the first memory, whether the first agent is capable of servicing the call, has an agent rating above a threshold value and is on duty,
queue, for the first agent, the call in the queue, in response to determining that the first agent is capable of servicing the call, has an agent rating above the threshold value and is on duty,
queue, for another agent, the call in the queue, in response to determining that the first agent is not capable of servicing the call, has an agent rating below the threshold value or is not on duty, and
determine whether the call has been queued for at least a predetermined period of time; and
a second voice portal comprising:
an interactive voice response unit configured to:
receive a message from the at least one computing device indicating that the call has been queued for at least the predetermined period of time,
interact with the customer to offer a call back service to the customer, wherein the call back service comprises at least one of a scheduled call back or an immediate type call back, and
receive, from the customer, an indication that the customer would like a call back, and
queuing logic configured to:
store an identifier in the queue for the call back.

14. The system of claim 13, wherein the indication that the customer would like a call back identifies an immediate type call back, the immediate type call back corresponding to a call back at a time when a next agent is available, and
wherein when storing an identifier in the queue, the queuing logic is configured to:

provide, in the queue, a call back identifier indicating a relative location in the queue at which to call the customer.

15. The system of claim 14, wherein the at least one computing device is further configured to:
   determine, for the immediate type call back, an estimated call back time, and
   provide the estimated call back time to the customer.

16. The system of claim 13, wherein the indication that the customer would like a call back identifies a scheduled call back, and
   wherein when storing an identifier in the queue, the queuing logic is configured to:
      provide, in the queue, a call back identifier indicating a time at which to call the customer.

17. The system of claim 16, wherein the second voice portal is further configured to:
   interact, with the customer to schedule the time for the call back.

18. The system of claim 17, wherein the at least one computing device is further configured to:
   identify available times to call the customer for the scheduled call back based on historic call volume information and a number of agents on duty at various periods of times.

19. The system of claim 18, wherein when identifying available times, the at least one computing device is further configured to:
   access profile information associated with previous calls from the customer, and
   identify a plurality of available times based on the profile information.

20. The system of claim 13, further comprising:
   an agent workstation; and
   wherein the second voice portal is further configured to:
      signal the agent workstation to automatically call the customer based on the stored identifier.

* * * * *